(12) United States Patent
Murabayashi et al.

(10) Patent No.: US 6,239,628 B1
(45) Date of Patent: *May 29, 2001

(54) SELF-TIMED SEMICONDUCTOR INTEGRATED CIRCUIT DEVICE

(75) Inventors: Fumio Murabayashi, Urizura-machi; Tatsumi Yamauchi, Hitachioota; Yutaka Kobayashi, Katsuta, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/245,897

(22) Filed: Feb. 8, 1999

Related U.S. Application Data

(63) Continuation of application No. 08/792,799, filed on Feb. 3, 1999, now Pat. No. 5,869,990, which is a continuation of application No. 08/308,303, filed on Sep. 19, 1994, now Pat. No. 5,612,640.

(30) Foreign Application Priority Data

Sep. 17, 1993 (JP) .................................................. 5-231250

(51) Int. Cl.[7] .............................. H04L 7/00; H03K 5/13
(52) U.S. Cl. ......................... 327/141; 327/293; 327/296
(58) Field of Search ........................... 327/141, 199–206, 327/208, 210–213, 227, 295, 299; 375/107

(56) References Cited

U.S. PATENT DOCUMENTS

| | | | |
|---|---|---|---|
| 4,424,581 | 1/1984 | Kawai | 327/202 |
| 4,661,922 | 4/1987 | Thierbach | 327/202 |
| 4,697,279 | 9/1987 | Baratti et al. | 327/202 |
| 4,839,604 | 6/1989 | Tanahashi | 327/295 |
| 4,951,301 | * 8/1990 | Zulian | 327/141 |
| 5,150,364 | * 9/1992 | Negus | 327/295 |
| 5,416,807 | 5/1995 | Brady et al. | 327/141 |
| 5,481,554 | * 1/1996 | Kondo | 371/53 |

* cited by examiner

Primary Examiner—Tuan T. Lam
(74) Attorney, Agent, or Firm—Antonelli, Terry, Stout & Kraus, LLP

(57) ABSTRACT

A semiconductor integrated circuit device is disclosed for self-monitoring presence/absence of a data flow and transmitting the data on the basis of the result of the monitoring. The semiconductor integrated circuit device comprises a plurality of data paths each further comprising at least two logic-circuit blocks. One of the data paths have data-arrival detector for detecting arrival of data and components on the other data paths operate synchronously with those on the data path having the data-arrival detector.

4 Claims, 16 Drawing Sheets

SELF-TIMED SEMICONDUCTOR INTEGRATED CIRCUIT DEVICE

CROSS-REFERENCE TO RELATED APPLICATIONS

This application is a continuation of application Ser. No. 08/792,799, now U.S. Pat. No. 5,869,990, filed Feb. 3, 1997, and which, in turn, was a continuation of application Ser. No. 08/308,303, filed Sep. 19, 1994, now U.S. Pat. No. 5,612,640, the entire disclosures of which are incorporated herein by reference.

BACKGROUND OF THE INVENTION

The present invention relates to a semiconductor integrated-circuit device, which, for example, may include a data processing device such as a microprocessor or a data storage device such as memory, wherein, while data is being transmitted thereto and therefrom, the presence/absence of a data flow is self-monitored and self-timed is carried out in the course of the data transmission.

A semiconductor integrated-circuit device embracing the first conventional technology is shown in FIG. 12. The semiconductor integrated-circuit device shown in the figure controls a plurality of functional logical blocks using clock signals.

A data path has a configuration comprising separated bits. For example, functional logical blocks $F_{11}$, $F_{12}$ and $F_{13}$ associated with the first bit are each sandwiched by latches placed before and after it. Each functional logical block operates synchronously with a clock signal. The functional logical blocks and latches associated with the second to nth bits are arranged in the same way as those for the first bit. The principle of operation is described by referring to a timing-chart shown in FIG. 18. Let us begin with the first bit. The functional logical block $F_{11}$ inputs data from a latch 150 on the rising edge of a clock (a). The processing of the data must be finished and a result to be supplied to a latch 151 must be set up within a time shorter than the period T of the clock. Much like the functional logical block $F_{11}$, the functional logical block $F_{12}$ inputs data from a latch 151 on the rising edge of the clock. Similarly, the processing of the data must be finished and a result to be supplied to a latch 152 must be set up within a time shorter than the period T of the clock. As shown in the figure, the functional logical blocks for the 2nd to nth bits operate with the same timing. By the way, the clock signal is actually distributed through metal wires laid out two-dimensionally. Accordingly, the timing varies from location to location. Let a skew tsk be the width of the timing discrepancy and $t_{F11}$ be a period of time between the rising edge of the clock for the latch 150 and a point of time at which the data supplied to the latch 151 is set. In this case, the following inequality must be satisfied:

$$t_{F11} < T - t_{sk} \quad (1)$$

Similarly, it is necessary for a functional logical block of any nth bit at any mth stage, where n and m are integers, to satisfy the same equality as the above as follows:

$$t_{Fnn} < T - t_{sk}$$

Accordingly, the clock period T is determined by the longest data processing time among all functional logical blocks. As a result, if the data processing times of all the functional logical blocks can be made about equal to each other, the clock period T can be made shortest.

A self-timed computing element in place of the computing element synchronized by a clock signal as described above is disclosed, for example, in a Stanford technical report entitled "Self-Timed Rings and their Application to Divison" CSL-TR-91-482, written by T. Williams in May 1991. Refer to FIG. 10.

A precharge functional block $F_2$ starts processing as soon as the block $F_2$ receives information on the completion of the resetting of a block $F_3$ at the following stage. The functional block $F_3$ detects the completion of its resetting by itself, transmitting a detection signal to the block $F_2$ at the preceding stage. By using such a self-synchronizing system, the delay time caused by a clock skew can be eliminated.

In the first conventional system example, each functional logical block operates synchronously with a clock signal. In such a clock-synchronized system, the period T of the clock signal is at least equal to the sum of the longest data processing time among all the functional logical blocks and the clock skew in accordance with Inequality (1). Accordingly, the operation frequency, the inverse number of the clock period T, is decreased by an amount determined by the clock skew.

In general, the performance of a system is proportional to the operation frequency. Accordingly, a problem that the performance is degraded by the clock skew exists. It is obvious from Inequality (1) that the clock period T is inevitably increased by the clock skew $t_{sk}$.

On top of that, the system must be designed so that the times required by all the functional logical blocks are about equal to each other. As a result, the system design becomes inevitably complicated.

In the case of the second conventional system example, on the other hand, a precharge functional block in only one data path is described to be either in a precharge or discharge state depending upon whether or not data is passing through the block. As for a plurality of data paths, there is no description whatsoever. In other words, the synchronization of the data paths associated with a plurality of bits for example is not described at all.

SUMMARY OF THE INVENTION

It is an object of the present invention to provide a system with a configuration wherein a plurality of data paths operate synchronously and the data paths are not affected by the clock skew.

The present invention provides a self-timed semiconductor integrated-circuit device characterized in that:

said self-timed semiconductor integrated-circuit device comprises at least two logic-circuit blocks for performing logical operations;

said logic-circuit blocks are connected to each other by data paths;

said data paths each have data-flow detecting units at data input units and data output units of said logic-circuit blocks connected thereby;

as data output by the nth of said logic-circuit blocks, where n is an integer equal to or greater than unity, through said data path connected thereto, said nth data-flow detecting unit of said data path generates an nth data-flow detecting signal indicating a flow of said data, supplying said nth data-flow detecting signal to the (n−1) th or (n+1)th of said logic-circuit blocks; and said nth data-flow detecting signal is used for controlling said (n−1)th or (n+1)th logic-circuit block.

With the configuration provided by the present invention as described above, the operation of another functional logical block connected to a data path can be controlled depending upon whether or not the flow of data exists;

allowing a self-synchronizing semiconductor integrated-circuit device for executing data processing without relying on a clock signal to be realized.

DESCRIPTION OF PREFERRED EMBODIMENTS

Figure 1:
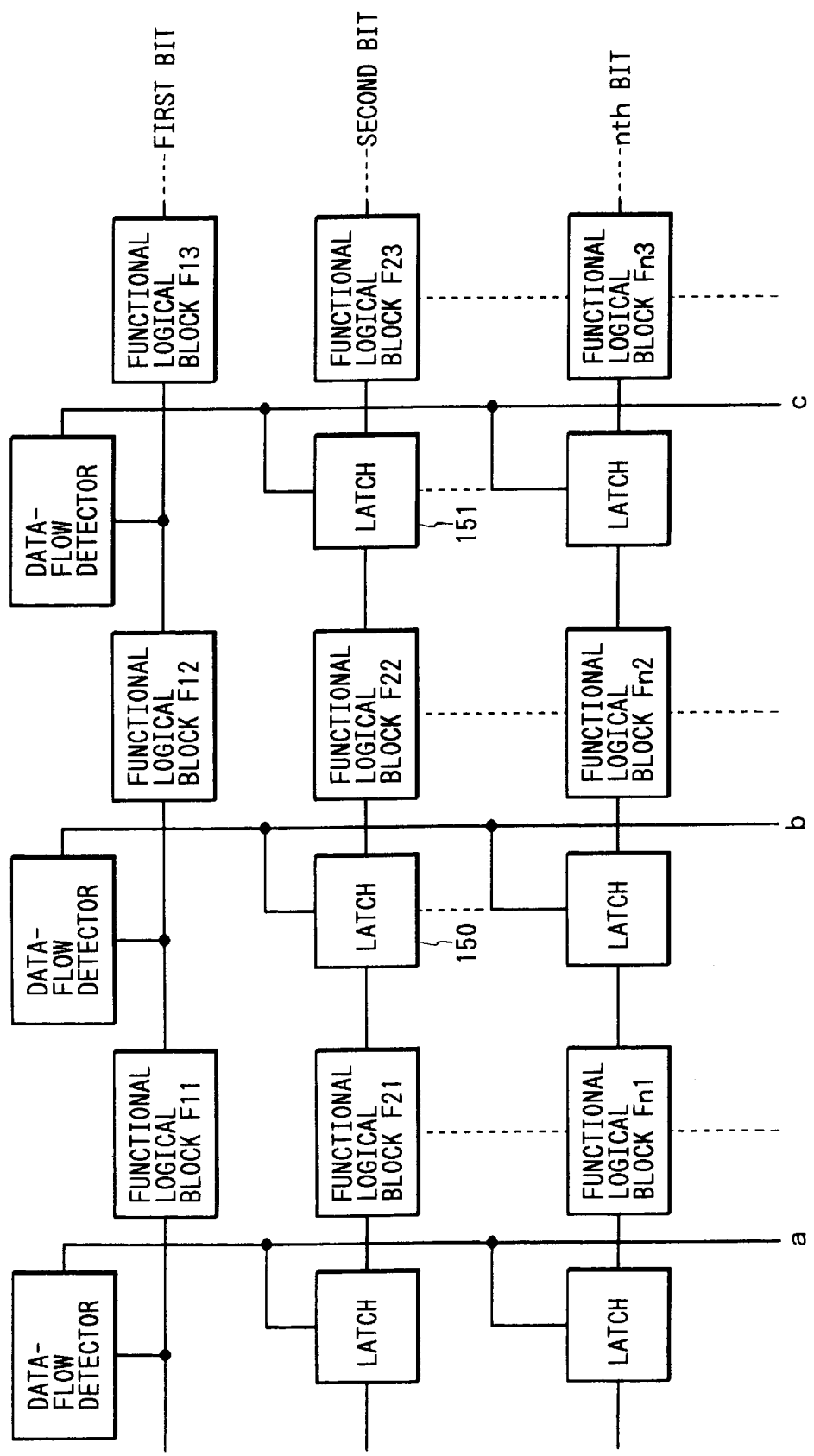
FIG. 1 shows a diagram used for explaining the structure of a first embodiment provided by the present invention.

A diagram used for explaining the principle of the present invention is shown in FIG. 1. As shown in the figure, functional logical blocks $F_{11}$, $F_{12}$ and $F_{13}$ associated with the first bit are connected in series. First of all, data is supplied to the functional logical block $F_{11}$. Then, the data subsequently flows to the functional logical blocks $F_{12}$ and $F_{13}$. A data-flow detector is provided at the output of each of the functional logical blocks associated with the first bit. The data-flow detector has a function for detecting the flow of new data output by the first bit's functional logical block connected to the data-flow detector. As the flow of new data is detected, the data-flow detector outputs a signal indicating that the new data is flowing. A latch is provided at the input of each functional logical block associated with the second and subsequent bits.

Each latch has a control pin connected to a signal line for transmitting the data-flow detecting signal of the first bit. For example, the control pin of a latch 150 connected to the output of a functional logical block $F_{21}$ associated with the second bit is connected to a control line (b) which is used by a data-flow detector for outputting a data-flow detecting signal when the data-flow detector detects the output of the functional logical block F11 associated with the first bit. The control pin of a latch 151 connected to the output of a functional logical block $F_{22}$ associated with the second bit at the next-stage is connected to a control line (c) which is used by a data-flow detector at the next stage for outputting a data-flow detecting signal when the data-flow detector at the next-stage detects the output of the functional logical block $F_{12}$ associated with the first bit at the next-stage. This configuration of latches and functional logical blocks is repeated for the third and subsequent bits. That is to say, the control pins of latches connected to the outputs of functional logical blocks which are associated with the second and subsequent bits and placed at a particular stage are connected to the control line of the data-flow detector for the particular stage. For example, the control pins of latches connected to the outputs of the functional logical blocks $F_{21}$ to $F_{n1}$ for stage 1 are all connected to the control line (b). On the other hand, the control pins of latches connected to the outputs of the functional logical blocks $F_{22}$ to $F_{n2}$ for stage 2 are all connected to the control line (c). In this configuration, functional logical blocks associated with the second and subsequent bits at a particular stage can operate synchronously with the data-flow detecting signal output by the data-flow detector for the particular stage. In addition, latches operating synchronously with a clock signal do not exist between functional logical blocks associated with the first bit. In other words, the clock skew does not affect their operations any more.

Figure 17:
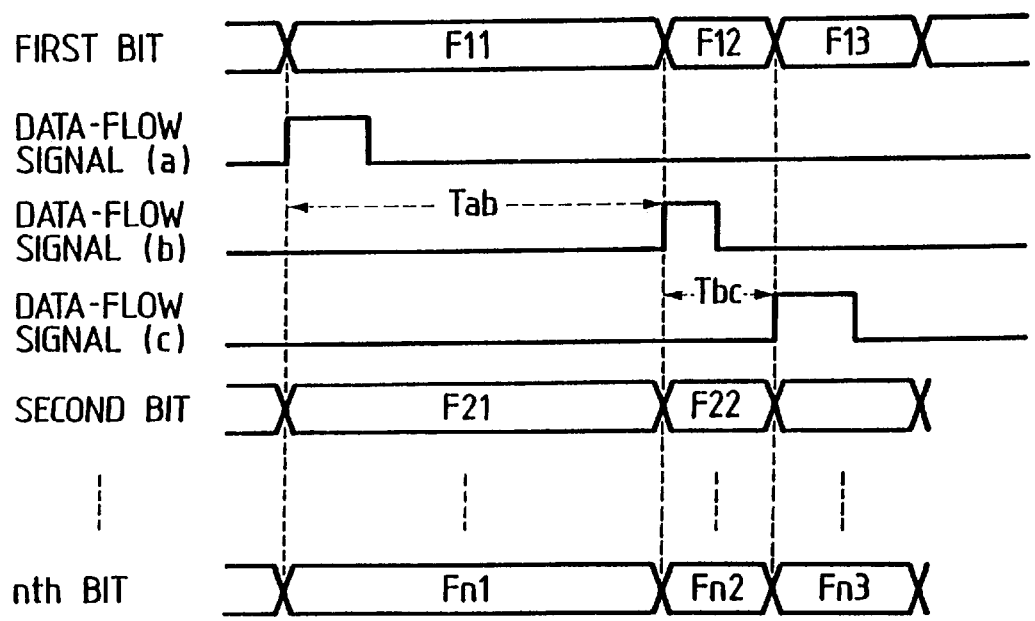
FIG. 17 shows a timechart of the structure shown in FIG. 1.
Figure 18:
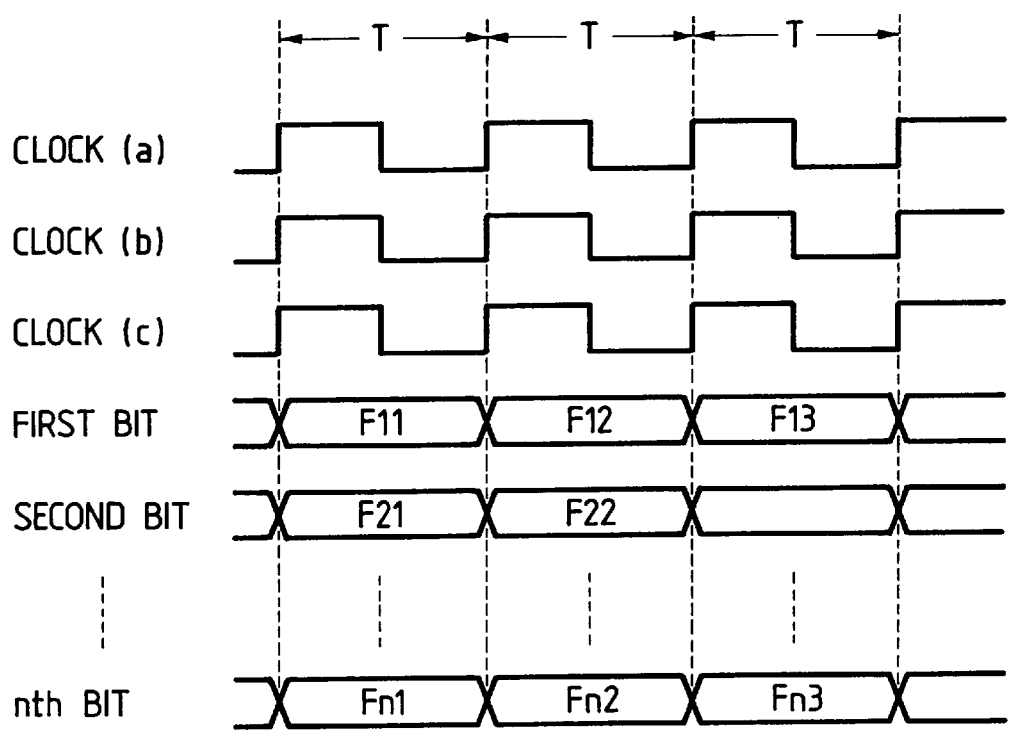
FIG. 18 shows is a diagram used for explaining the first prior art.

The principle of operation of the configuration provided by the present invention as shown in FIG. 1 is explained by referring to a timechart shown in FIG. 17. Since the functional logical blocks $F_{11}$ to F1$n$ associated with the first bit are not sandwiched by latches operating synchronously with a clock signal, data is propagated with a delay time which depends upon only the logical functions of the blocks. For example, let the propagation time of data through the functional logical block $F_{11}$ be long and the propagation times through the blocks $F_{12}$ and $F_{13}$ be shorter than that of the block $F_{11}$ as shown in FIG. 17. Detecting a data flow at the output of a functional logical block at a stage before the block $F_{11}$, the data-flow detector provided for the first bit at stage 0 activates a data-flow detecting signal (a) to indicate that data has passed. Likewise, the data-flow detecting signals (b) and (c) are activated for indicating that data has appeared at the outputs of the functional logical blocks $F_{11}$ and $F_{12}$ respectively. Accordingly, the period of time $T_{ab}$ between the rising edges of the data-flow detecting signals (a) and (b) is longer than the period of time $T_{bc}$ between the rising edges of the data-flow detecting signals (b) and (c).

It is thus obvious that, unlike the clock period, the timing for data of the second and subsequent bits is determined by the control signals (a), (b) and (c) not at fixed intervals. Instead, the timing varies depending upon the data processing times of the functional logical blocks associated with the first bit. The functional logical blocks associated with the second and subsequent bits at a particular stage operate synchronously with the data-flow detecting signal output by the data-flow detector on the first bit for the particular stage. In the case of the second bit for example, the functional logical block $F_{21}$ at stage 1 inputs data on the rising edge of the data-flow detecting signal (a) for stage 1. Subsequently, the functional logical block $F_{22}$ at stage 2 inputs data on the rising edge of the data-flow detecting signal (b) for stage 2. The functional logical block $F_{21}$ associated with the second bit at stage 1 is designed so as to satisfy the following inequality:

$$t_{F21} < T_{ab} \tag{2}$$

where $t_{F21}$ is the data processing time of the functional logical block $F_{21}$. Similarly, the functional logical block $F_{22}$ associated with the second bit at stage 2 is designed so as to satisfy the following inequality:

$$t_{F22} < T_{bc} \tag{3}$$

where $t_{F22}$ is the data processing time of the functional logical block $F_{22}$. In comparison to the first inequality ($t_{F11} < T - t_{sk}$), Inequalities (2) and (3) allow the functional logical blocks $F_{21}$ and $F_{22}$ employed in the configuration provided by the present invention to be designed with the data processing times $t_{F21}$ and $t_{F22}$ being independent of the clock skew $t_{sk}$. The independence of the clock skew $t_{sk}$ holds true for the design of functional logical blocks associated with the second bit at the subsequent stages and all blocks for the remaining bits. On top of that, Inequalities (2) and (3) also indicate the independence of the fixed clock period T. Accordingly, the data processing time of a functional logical block may vary from stage to stage. That is to say, in the case of the conventional device, the clock period is determined by the sum of the data propagation time of a functional logical block having the longest data processing time and the clock skew. Thus, the performance of the conventional device which is proportional to the inverse number of the clock period is also determined by the longest data processing time and the clock skew. In the case of a device provided by the present invention, on the other hand, the total data processing time is affected by a functional logical block with the longest data processing time only to a certain degree. Thus, its performance is dependent upon only the total data processing time. The total data processing time is equal to the sum of longest data processing times, wherein each longest data processing time is selected among functional logical blocks associated with all bits at a particular stage. In addition, it is also obvious that the performance is independent of the clock skew. As a result, the performance is by no means deteriorated by the clock skew.

Figure 2:
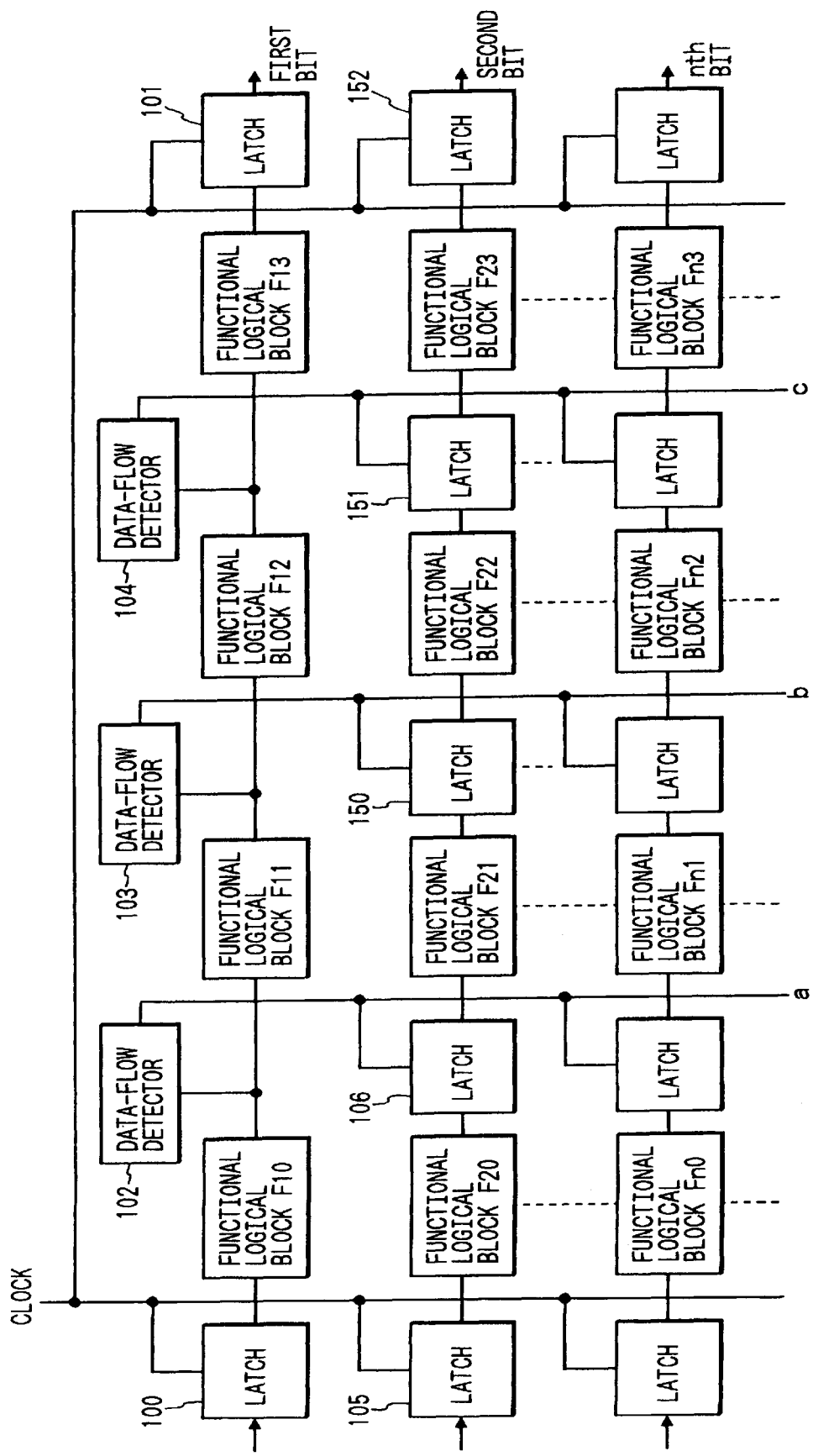
FIG. 2 shows a diagram used for explaining the structure of another embodiment provided by the present invention.

A first embodiment is shown in FIG. 2. As shown in the figure, components associated with the first bit include functional logical blocks $F_{10}$, $F_{11}$, $F_{12}$ and $F_{13}$ with data-flow detectors 102, 103 and 104 connected to data paths connecting the functional logical blocks 102, 103 and 104. The functional logical blocks $F_{10}$ to $F_{13}$ are connected by the data paths in series. A latch 100 is connected to the input of the functional logical data block $F_{10}$ whereas a latch 101 is connected to the output of the functional logical block $F_{13}$.

The data-flow detectors 102, 103 and 104 are connected to the outputs of the functional logical blocks $F_{10}$, $F_{11}$ and $F_{12}$ respectively. Control lines (a), (b) and (c) convey signals output by the data-flow detectors 102, 103 and 104 respectively. Control pins of the latches 100 and 101 are connected to a clock line. Components associated with the second bit are functional logical blocks $F_{20}$, $F_{21}$, $F_{22}$ and $F_{23}$ with latches 105, 106, 150, 151 and 152 placed alternately with them. To be more specific, the latch 105 is connected to the input of the functional logical block $F_{20}$, the latch 106 is connected to the output of the block $F_{20}$, the latch 150 is connected to the output of the block $F_{21}$, the latch 151 is connected to the output of the block $F_{22}$ and the latch 152 is connected to the output of the block $F_{23}$. The functional logical blocks $F_{20}$ to $F_{23}$ and the latches 105, 106, 150, 151 and 152 are connected in series. Control pins of the latches 105 and 152 are also connected to the clock line whereas control pins of the latches 106, 150 and 151 are connected to the control lines (a), (b), and (c) respectively. The configuration of components associated with any nth bit, where n is an integer equal to or greater than 3, is identical with that of the second bit. In other words, the configuration of the components associated with the second bit is repeated for the third and subsequent bits.

Figure 3:
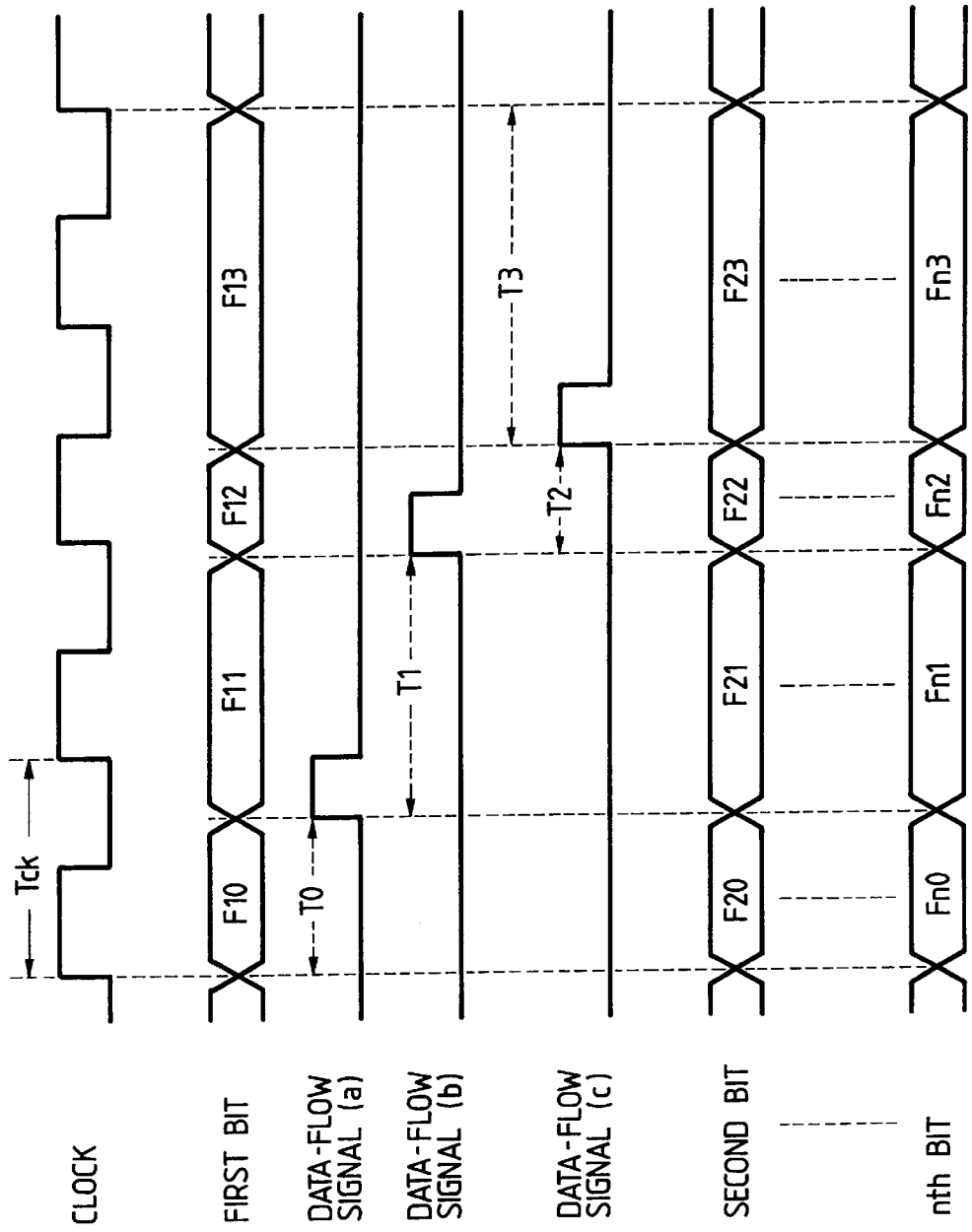
FIG. 3 shows a timechart of the stucture shown in FIG. 2.

Next, the principle of operation of the embodiment is described by referring to a timechart shown in FIG. 3. Data of the first bit is input to the latch 100 and output from the latch 101. The latch 100 inputs the data on the rising edge of the clock. The data is then supplied to the latch 101 through the functional logical blocks $F_{10}$, $F_{11}$, $F_{12}$ and $F_{13}$. The latch 101 outputs the data also on the rising edge of the clock. The functional logical blocks $F_{10}$, $F_{11}$, $F_{12}$ and $F_{13}$ associated with the first bit are designed so as to satisfy the following inequality:

$$t_{F10} + t_{F11} + t_{F12} + t_{F13} < 4T_{ck} - t_{sk} \tag{4}$$

where $t_{F10}$, $t_{F11}$, $t_{F12}$ and $t_{F13}$ are the propagation delay times of the functional logical blocks $F_{F10}$, $F_{11}$, $F_{12}$ and $F_{13}$ respectively, $t_{sk}$ is the clock skew and $T_{ck}$ is the period of the clock signal. Detecting the flow of the data at the output of the functional logical block $F_{10}$, the data-flow detector 102 asserts a data-flow detecting signal (a) on the control line (a). Likewise, the data-flow detectors 103 and 104 asserts data-flow detecting signals (b) and (c) on the control lines (b) and (c) respectively. As for the second bit, data is input to the latch 105 and output from the latch 152 on rising edges of the clock. The data passes through the functional logical block $F_{20}$, the latch 106, the block $F_{21}$, the latch 150, the block $F_{22}$, the latch 151, the block $F_{23}$ and finally the latch 152 one after another. The latch 106 inputs the data on the rising edge of the control signal (a) whereas the latches 150 and 151 input the data on the rising edges of the control signals (b) and (c). In this way, a functional logical block associated with the second stage at any stage operates synchronously with the corresponding block associated with the first bit at the same stage. The functional logical blocks $F_{20}$, $F_{21}$, $F_{22}$ and $F_{23}$ associated with the second bit are designed so as to satisfy the following inequalities:

$$t_{F20} < T_0 \tag{5}$$
$$t_{F21} < T_1 \tag{6}$$
$$t_{F22} < T_2 \tag{7}$$
$$t_{F23} < T_3 \tag{8}$$

where $t_{F20}$, $t_{F21}$, $t_{F22}$ and $t_{F23}$ are the propagation delay times of the functional logical blocks $F_{20}$, $F_{21}$, $F_{22}$ and $F_{23}$ respectively, $T_0$ is a time gap between the rising edges of the clock and the control signal (a), $T_1$ is a time gap between the rising edges of the control signals (a) and (b), $T_2$ is a time gap between the rising edges of the control signals (b) and (c) and $T_3$ is a time gap between the rising edges of the control signal (c) and the clock. Components associated with the third and subsequent bits operate in the same way as those associated with the second bit. After all, the embodiment only requires that Inequality (4) be satisfied by the components associated with the first bit and Inequalities (5) to (8) be satisfied by those associated with the second and subsequent bits.

Let us next compare the above inequalities which prescribe design conditions for a self-timed semiconductor integrated-circuit device provided by the present invention to the inequality for a corresponding device embracing the first conventional technology.

With the first conventional technology, every functional logical block associated with any bit is required that its propagation time delay be no longer than one clock period. In the case of the components associated with the first bit, for example, it is necessary to satisfy the following inequalities:

$$t_{F10} < T_{ck} - t_{sk} \quad (9)$$

$$t_{F11} < T_{ck} - t_{sk} \quad (10)$$

$$t_{F12} < T_{ck} - t_{sk} \quad (11)$$

$$t_{F13} < T_{ck} - t_{sk} \quad (12)$$

From Inequalities (9) to (12), the following can be derived:

$$t_{F10} + t_{F11} + t_{F12} + t_{F13} < 4T_{ck} - 4t_{sk} \quad (13)$$

As is commonly known, the performance of a device is proportional to the inverse number of the sum of the propagation delay times of the functional logical blocks as is expressed by the following equation:

$$\text{Performance} \propto \frac{1}{t_{F10} + t_{F11} + t_{F12} + t_{F13}} \quad (14)$$

By the way, the sums of the propagation delay times of the functional logical blocks for the embodiment provided by the present invention and a device of the first conventional technology have to satisfy Inequalities (4) and (13) respectively. It is thus obvious that the clock skew has an effect on the performance of a device adopting the first conventional as much as four times the effect on the embodiment provided by the present invention. If Inequalities (5) to (8) are satisfied, components associated with the second and subsequent bits operate synchronously with those associated with the first bit. With components of all bits operating synchronously with those of the first bit, pipelining can be introduced with ease even if a data branch to another bit and a data merge from another bit exists. As for the second conventional technology, inter-bit synchronization is not taken into consideration at all.

Figure 11:
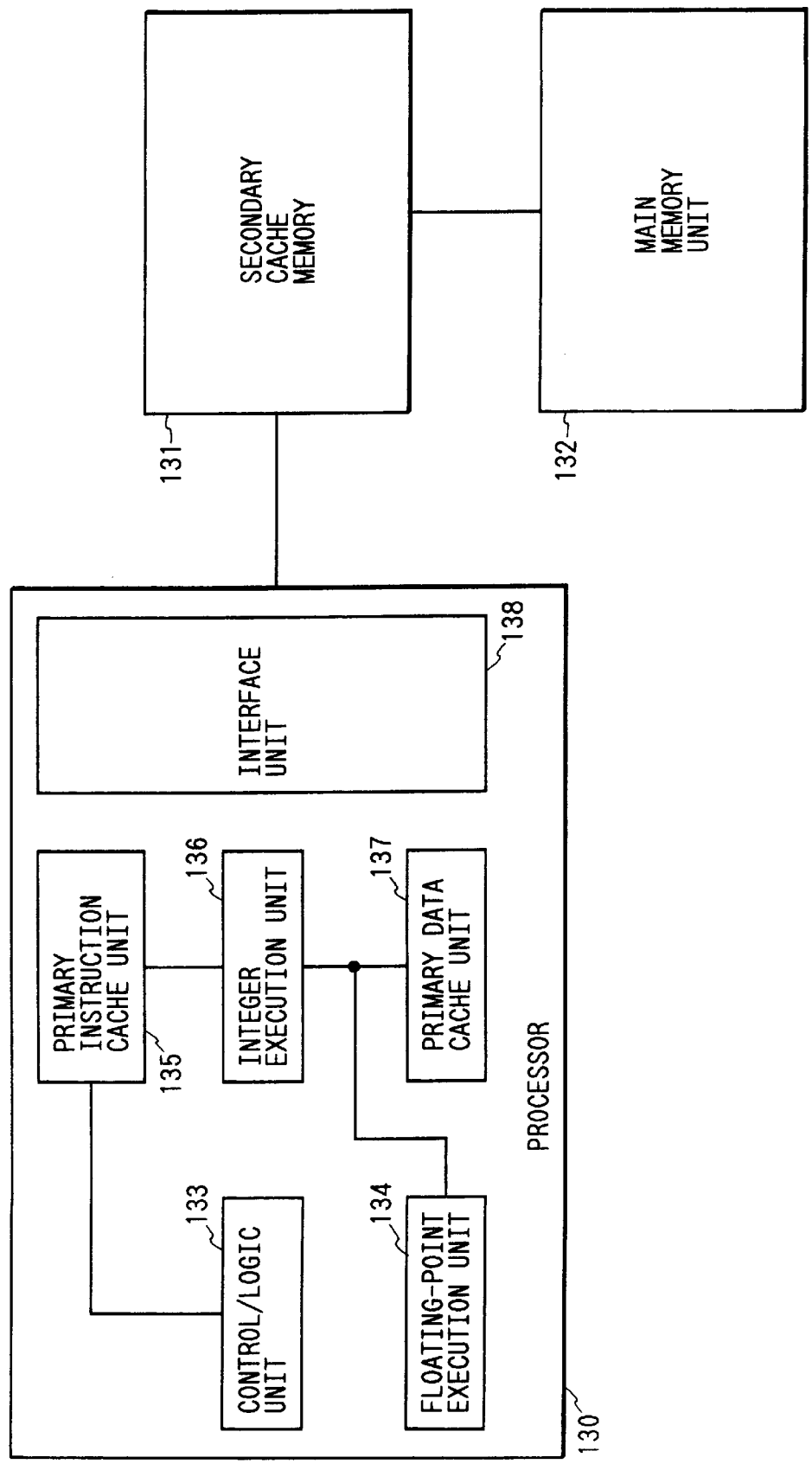
FIG. 11 shows a diagram used for explaining fields of applications.
Figure 12:
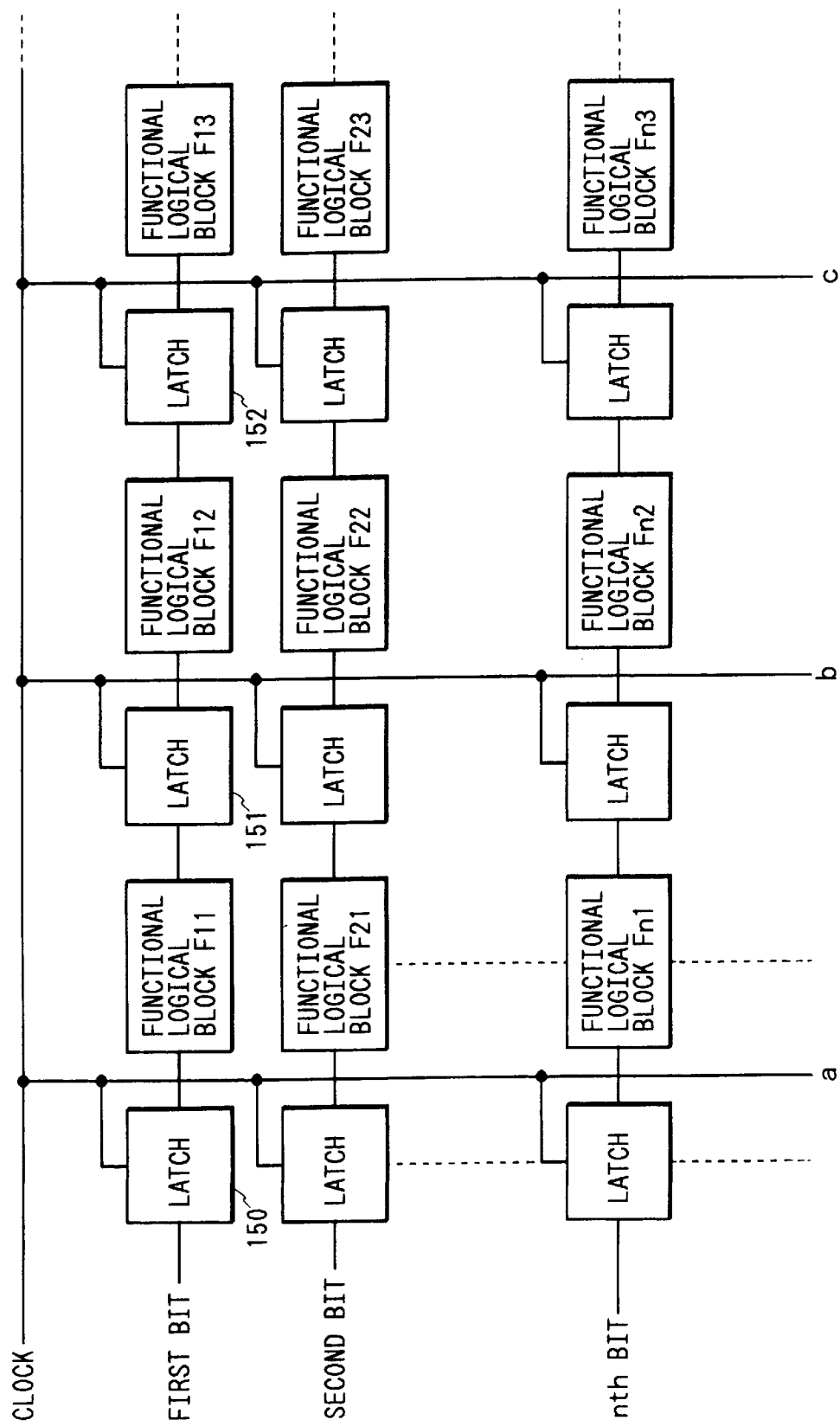
FIG. 12 shows a diagram used for explaining the first prior art.
Figure 13:
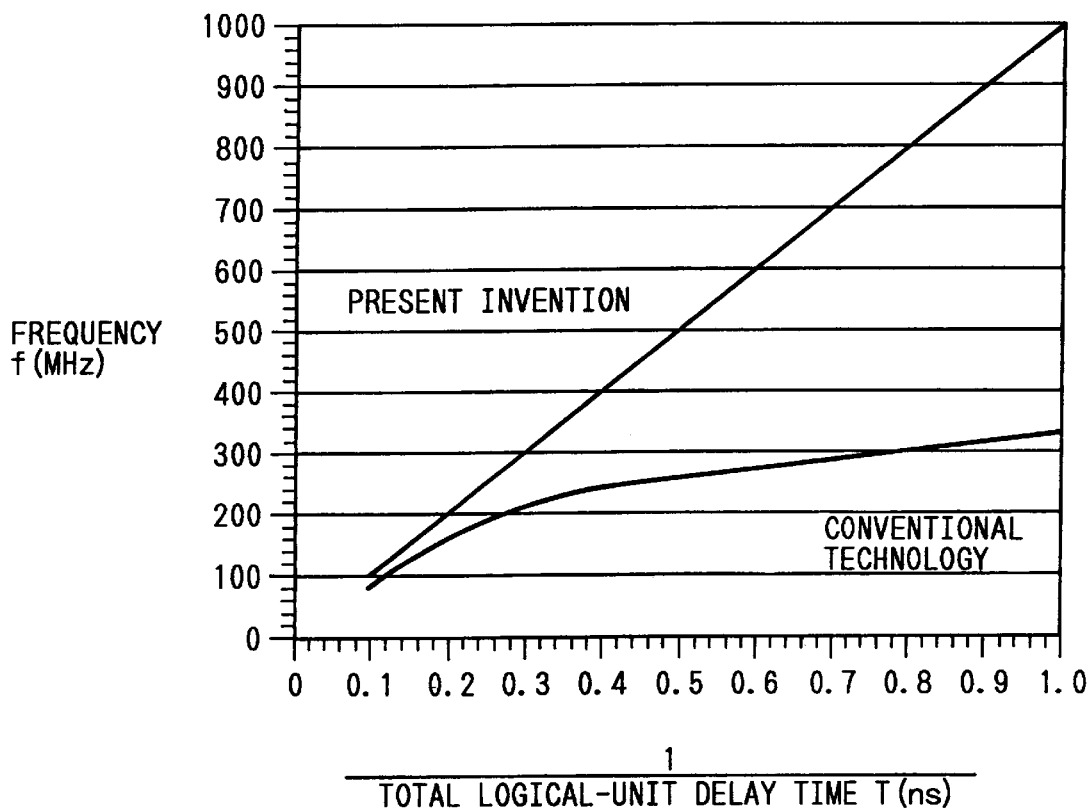
FIG. 13 shows a diagram used for explaining problems encountered in the first prior art.

One of typical representative application apparatuses of the embodiment is shown in FIG. 11. Reference numerals 130 and 131 denote a processor and a secondary cache memory unit respectively whereas reference numeral 132 is a main memory unit. The processor 130 comprises embedded components such as a primary instruction cache unit 135, a primary data cache unit 137, a floating-point execution unit 134, an integer execution unit 136, a control/logic unit 133 and an interface unit 138. By applying the present invention, the whole device can be designed to comprise circuits which do not use a clock signal at all. At least the present invention can be applied to some critical units and circuits. Examples of such critical units and circuits are parts engaged in the data transmission among the processor 130, the secondary cache memory unit 131 and the main memory unit 132 and components involved in internal data processings therein. In this way, the number of components prone to the effect of the clock skew can be reduced or such components can even be eliminated completely.

Figure 4:
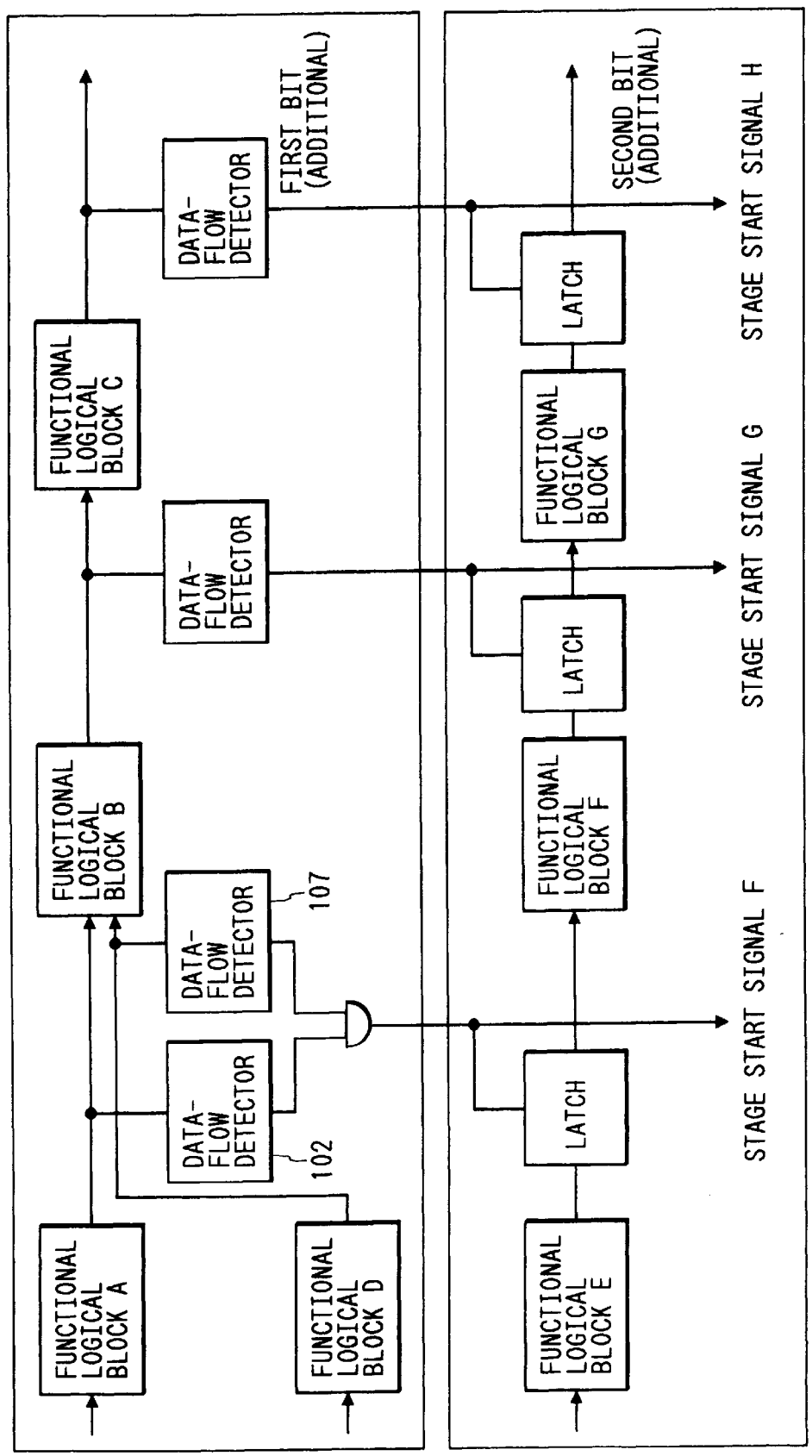
FIG. 4 shows another embodiment wherein a merge exists in a data path.

Next, an embodiment wherein a merge exists in the data path of the first bit is explained by referring to FIG. 4.

As shown in the figure, the output of a logic circuit block A is merged with the output of a logic circuit block D before being supplied to a logic circuit block B as merged data. In this case, it is necessary to transmit a stage start signal to components associated with the second and subsequent bits upon the detection of a data-flow detecting signal for either the output of the logic circuit block A or the output of the logic circuit block D, whichever is lagging.

However, it is not necessarily possible to determine in advance whether the setting-up time of the output of the logic circuit block A is earlier or later than that of the output of the logic circuit block D.

Accordingly, the outputs of the logic circuit blocks A and D are both monitored by data-flow detectors 102 and 107 respectively as shown in the figure. The timing of a logical-and signal of the outputs of the data-flow detectors 102 and 107 can then be regarded as the timing of the lagging output generated by either the logic circuit block A or D. Therefore, the logical-and signal is used as a stage start signal F.

A logic circuit block F associated with the second bit thereby operates synchronously with the timing with which the lagging output of either the logic circuit block A or D is set up.

Figure 5:
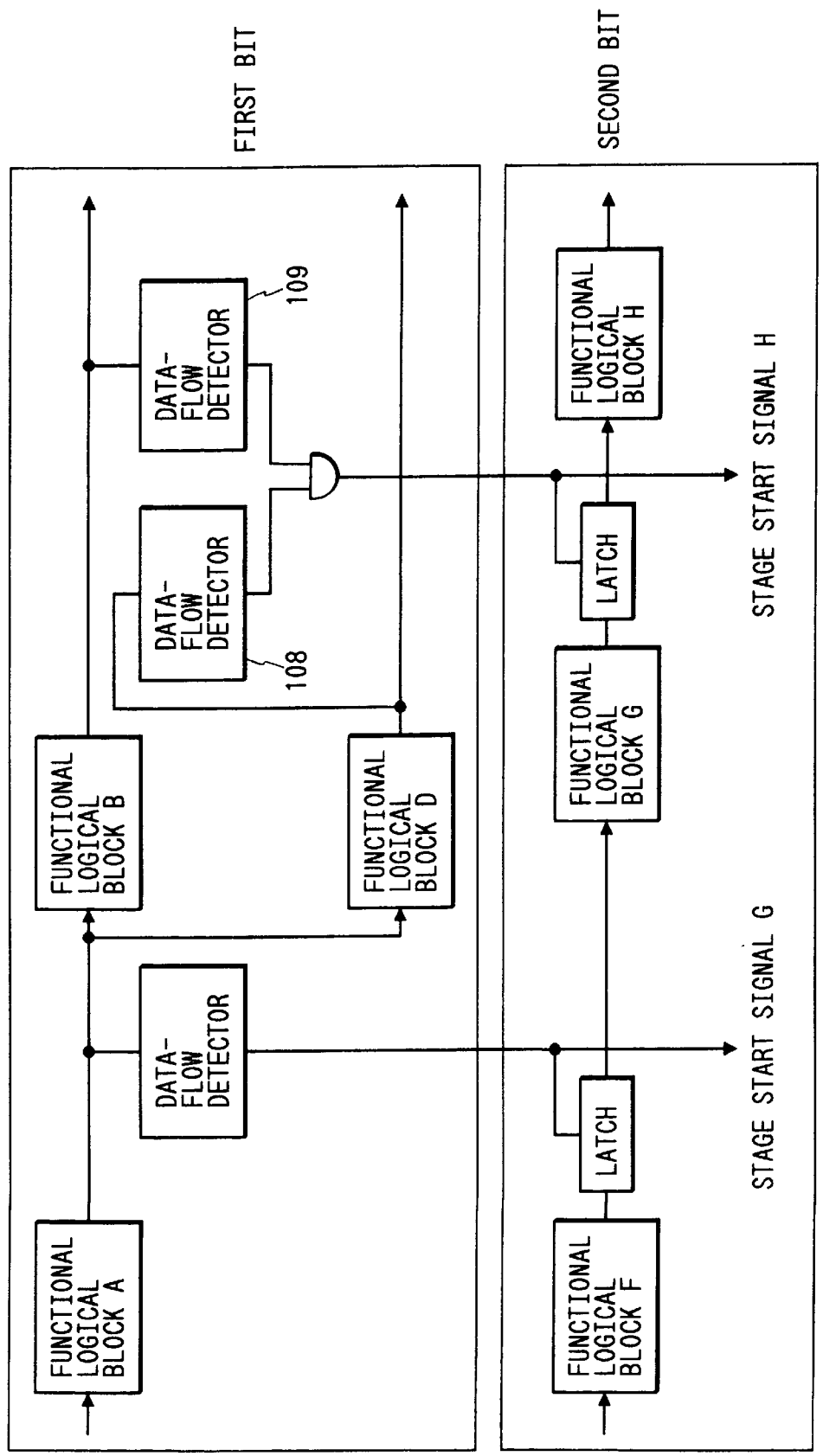
FIG. 5 shows another embodiment wherein a branch exists in a data path.

Next, an embodiment wherein a branch exists in the data path of the first bit is explained by referring to FIG. 5.

As shown in the figure, the output of a logic circuit block A is split to logic circuit blocks B and D. In this case, it is not necessarily possible to determine in advance whether the setting-up time of the output of the logic circuit block B is earlier or later than that of the output of the logic circuit block D.

Accordingly, the outputs the logic circuit blocks B and D are both monitored by data-flow detectors 108 and 109 respectively as shown in the figure. The timing of a logical-and signal of the outputs of the data-flow detectors 108 and 109 can then be regarded as the timing of the lagging output of either the logic circuit block B or D. Therefore, the logical-and signal is used as a stage start signal H. A logic circuit block H associated with the second bit thereby operates synchronously with the timing with which the lagging output of either the logic circuit block B or D is set up.

The embodiments described above can be applied not only to the control of a local component on a data path but also to the control of the entire data path.

Figure 14:
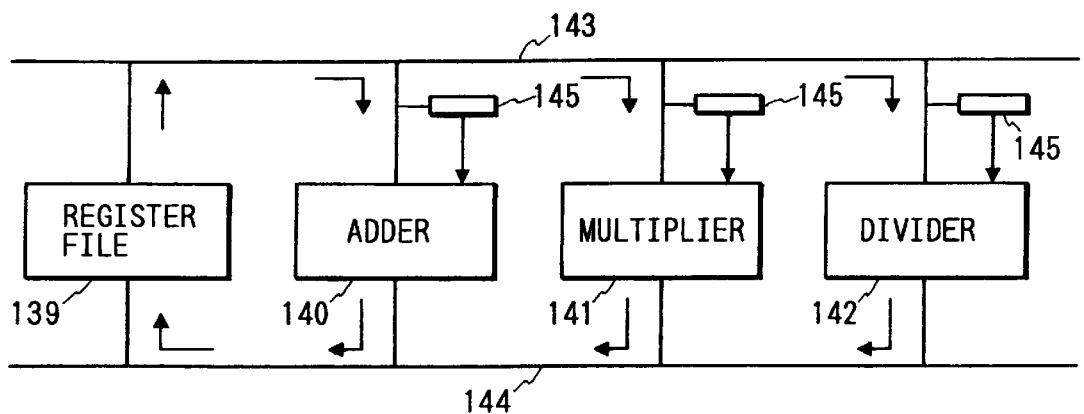
FIG. 14 shows a diagram used for explaining a floating-point execution unit.

A typical floating-point execution unit is shown in FIG. 14. As shown in the figure, the floating-point execution unit comprises a register file 139, an adder 140, a multiplier 141 and a divider 142 which are connected to each other by a source bus 143 and a target bus 144. Data read out from the register file 139 is supplied to the arithmetic units 140 to 142 through the source bus 143. Data completing processing at the arithmetic units 140 to 142 is written into the register file 139 through the target bus 144. The arithmetic units 140 to 142 are each provided with a data-flow detector 145. A data-flow detector 145 detects data flowing into an arithmetic unit 140, 141 or 142 associated with the data-flow detector 145, notifying it of the incoming data. The arithmetic units 140 to 142 thereby start operations synchronously with the detection timing. In some cases, only one of the arithmetic units 140 to 142 operates or, in other cases, all of them may operate simultaneously.

Figure 6:
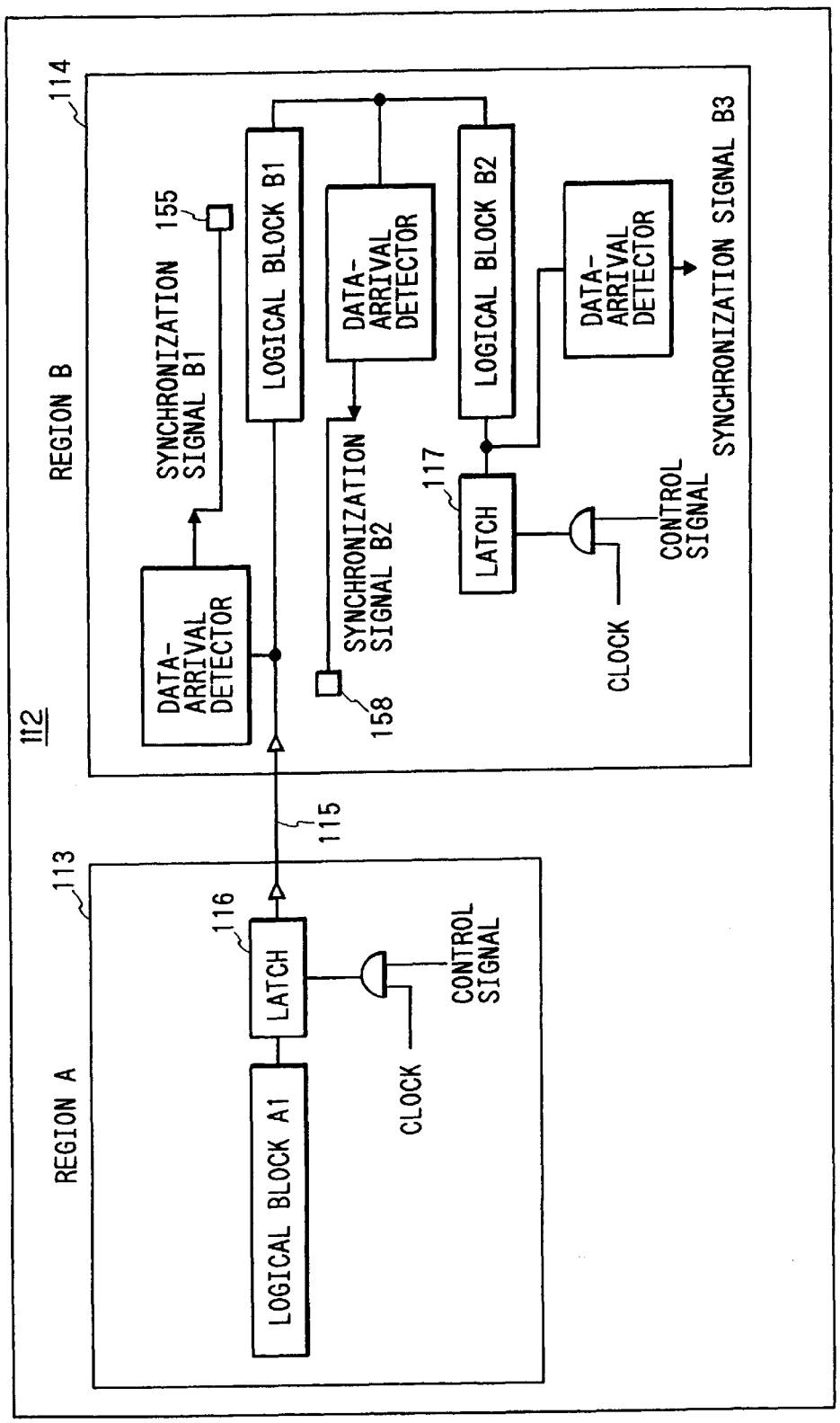
FIG. 6 shows a diagram used for explaining the structure of another embodiment provided by the present invention.

Another embodiment provided by the present invention is shown in FIG. 6. In a self-timed semiconductor integrated-circuit device 112 which is built into a single chip, at least two physically separated A and B regions denoted by reference numerals 113 and 114 respectively exist. The A and B regions 113 and 114 are each a group of logical blocks. The physically separated A and B regions 113 and 114 are connected to each other by a long signal line 115, making it difficult to synchronize the A and B regions 113 and 114 with each other accurately by using a clock signal. On top of that, being physically separated, a long delay time is inevitably required for transmitting data from the A region 113 to the B region 114.

It is therefore hard to transmit data at a high speed by using the clock-synchronization system.

The embodiment shown in FIG. 6 is an example of a data reception system which adopts the self-synchronizing technique requiring no clock synchronization. Transmission of data from the A region 113 is started synchronously with a clock signal. The data is transmitted to the B region 114 through the long signal line 115. A data-flow detector in the B region 114 detects the arrival of the data, activating a synchronization signal B1. The data is supplied to a latch through logical blocks B1 and B2. The appearance of data at the output of the logical block B1 is detected to generate a synchronization signal B2. Likewise, the appearance of data at the output of the logical block B2 is detected to generate a synchronization signal B3. Logical blocks 155 and 158 and another logical block not shown in the figure on this data path in the B region 114 operate synchronously with the synchronization signals B1, B2 and B3 respectively.

In such a configuration, if attention is paid only to a total delay time along a data path starting from a latch 116 in the A region 113 and ending at a latch 117 in the B region 114, limitation imposed by the clock skew and timing is found out to be little.

Figure 15:
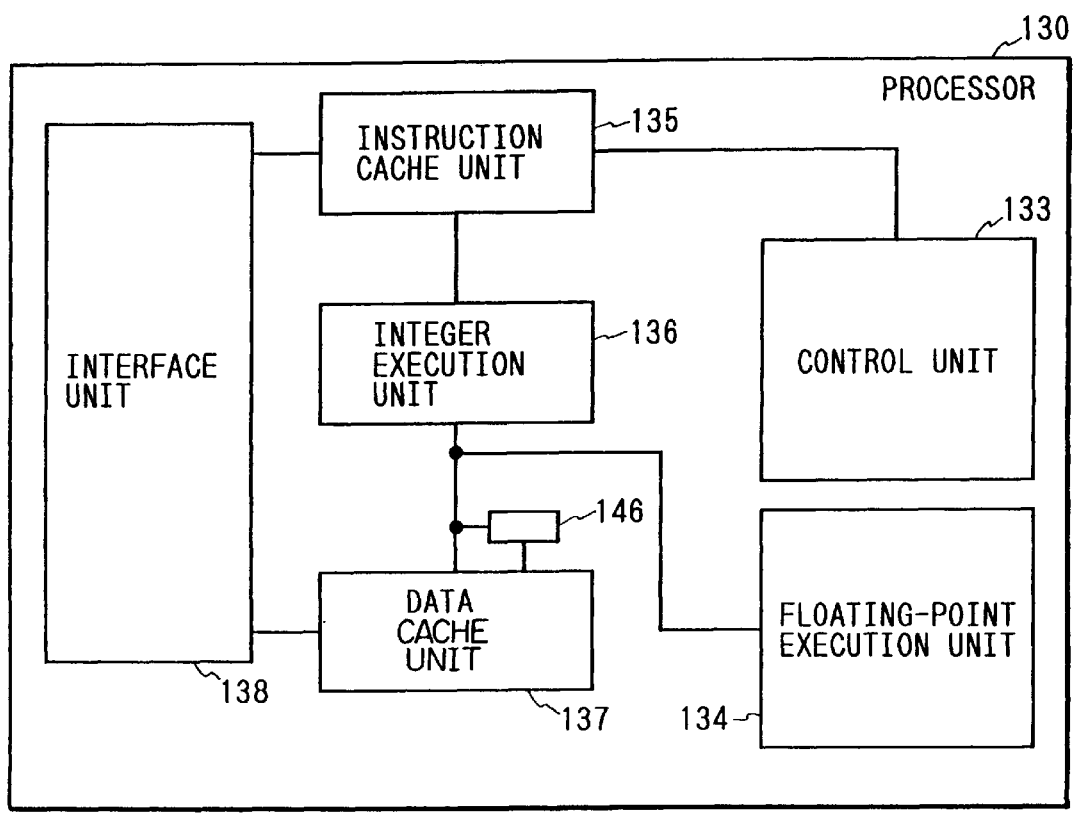
FIG. 15 shows an implementation example more actual than the embodiment of FIG. 6.

An implementation example more actual than the embodiment of FIG. 6 is shown in FIG. 15. A processor 130 comprises embedded components such as a data cache unit 137, an instruction cache unit 135, a floating-point execution unit 134, an integer execution unit 136, a control unit 133 and an interface unit 138 which are connected to each other by signal lines. An address transmitted by the integer execution unit 136 to the data cache unit 137 is detected by a signal-arrival detector 146. Synchronized with this detection timing, the data cache unit 137 outputs data. To be more specific, the data cache unit 137 employs at least one latch which is controlled by an arrival detection signal output by the signal-arrival detector 146. The data output by the data cache unit 137 is transferred to the integer execution unit 136 and the floating-point execution unit 134. This self-timed control scheme can be applied not only to the data cache unit 137 of the embodiment, but also to other units employed in the processor 130 as well.

Figure 7:
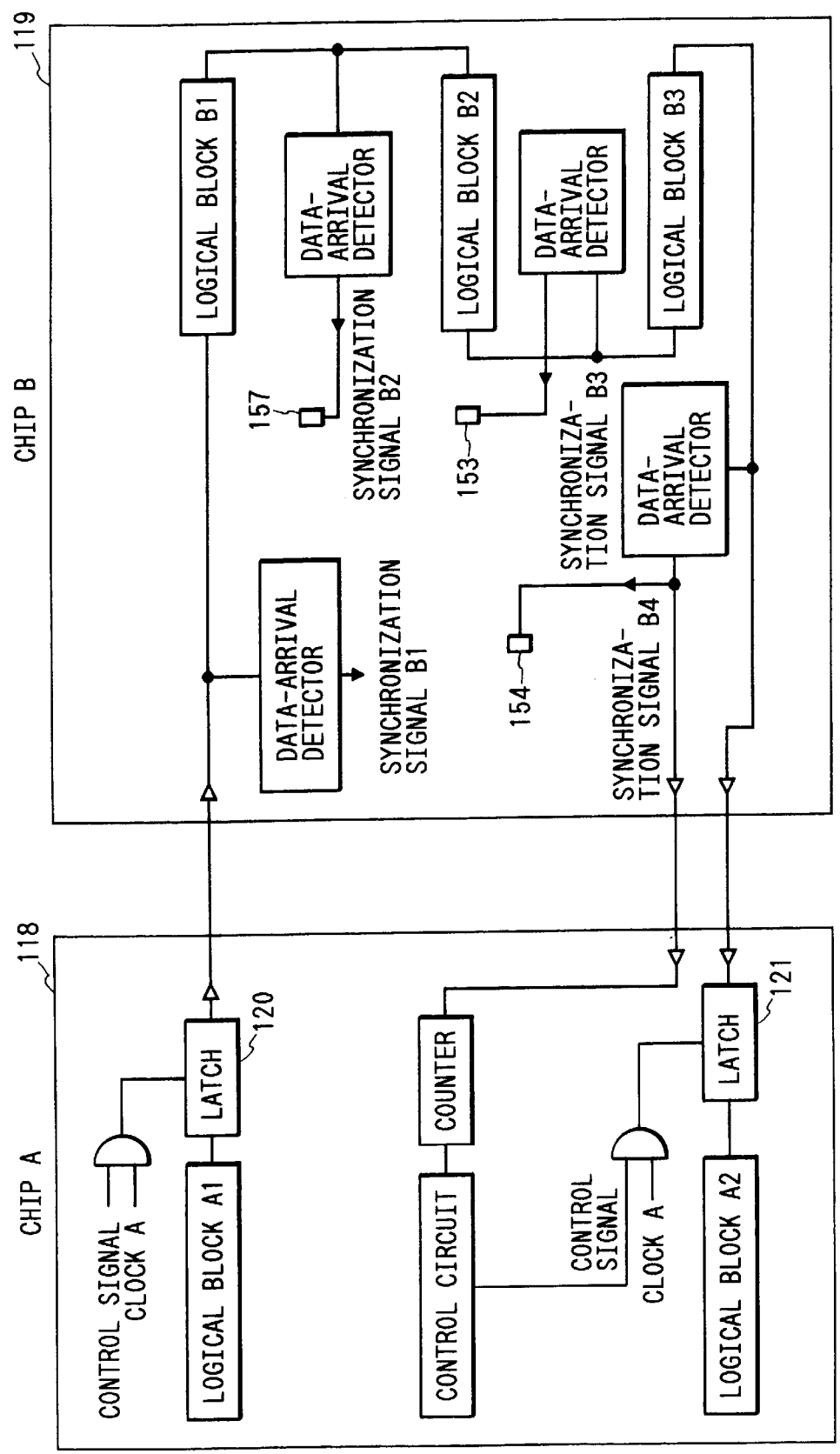
FIG. 7 shows a diagram used for explaining the structure of another embodiment provided by the present invention.

An embodiment wherein the present invention is applied to transmission of data between chips is shown in FIG. 7. An A chip denoted by reference numeral 118 is typically a microprocessor whereas a B chip denoted by reference numeral 119 is, for example, a memory unit. An address is transmitted from the A chip 118 to the B chip 119.

The address arriving at the B chip 119 is detected by a data-arrival detector employed therein. Detecting the address, the data-arrival detector outputs a synchronizing signal B1. In response to this address, data is transmitted to a latch 121 employed in the A chip 118 through logical blocks B1, B2 and B3 of the B chip 119. As the data appears at the output of the logical block B1, another data-arrival detector generates a synchronizing signal B2. Likewise, as the data appears at the outputs of the logical blocks B2 and B3, still other data-arrival detectors issue synchronizing signals B3 and B4 respectively.

Other logical blocks 157, 153 and 154 employed in the B chip 119 operate synchronously with the synchronizing signals B2, B3 and B4 respectively.

As described above, the data is transmitted from the B chip 119 to the A chip 118 in response to the address. A latch 120 employed in the A chip 118 for transmitting an address and the latch 121 cited above are controlled by a clock signal A and a control signal in much the same way as the embodiment shown in FIG. 6. The control signal allows only desired data to be latched.

Figure 8:
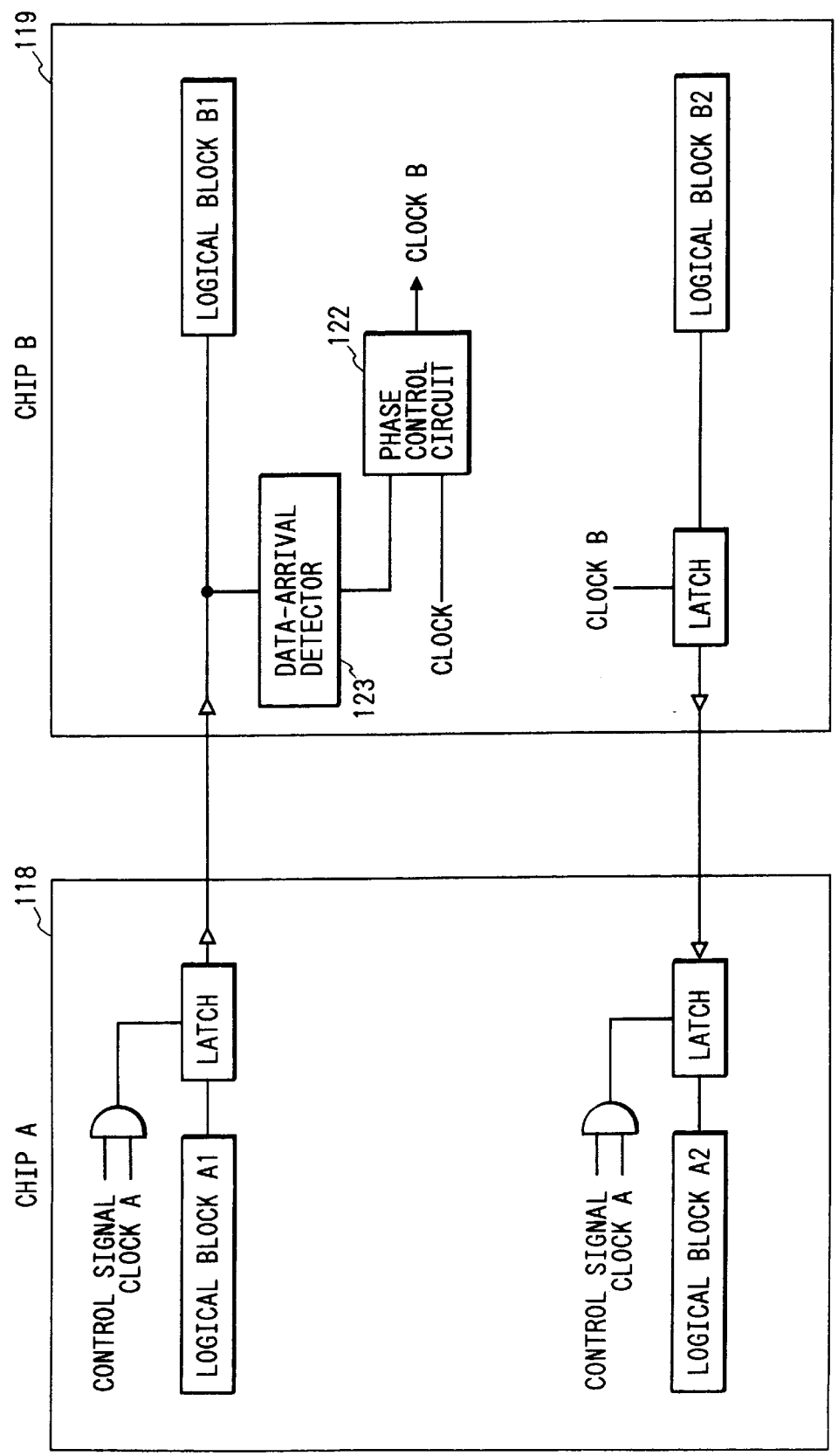
FIG. 8 shows a diagram used for explaining the structure of another embodiment provided by the present invention.

Another embodiment wherein the present invention is applied to transmission of data between chips is shown in FIG. 8. An address is transmitted from an A chip 118 to a B chip 119. The address arriving at the B chip 119 is detected by a data-arrival detector employed therein. Detecting the address, the data-arrival detector outputs a synchronizing signal 123. A clock signal for the B chip 119 has its phase controlled by a phase control circuit 122. Executing the phase control, the circuit 122 generates a clock signal B which is synchronized with the synchronizing signal 123. The B chip 119 operates with the clock signal B used as a source clock. Typically, the phase control circuit 122 adopts the PLL (Phase Locked Loop) technique.

Figure 9:
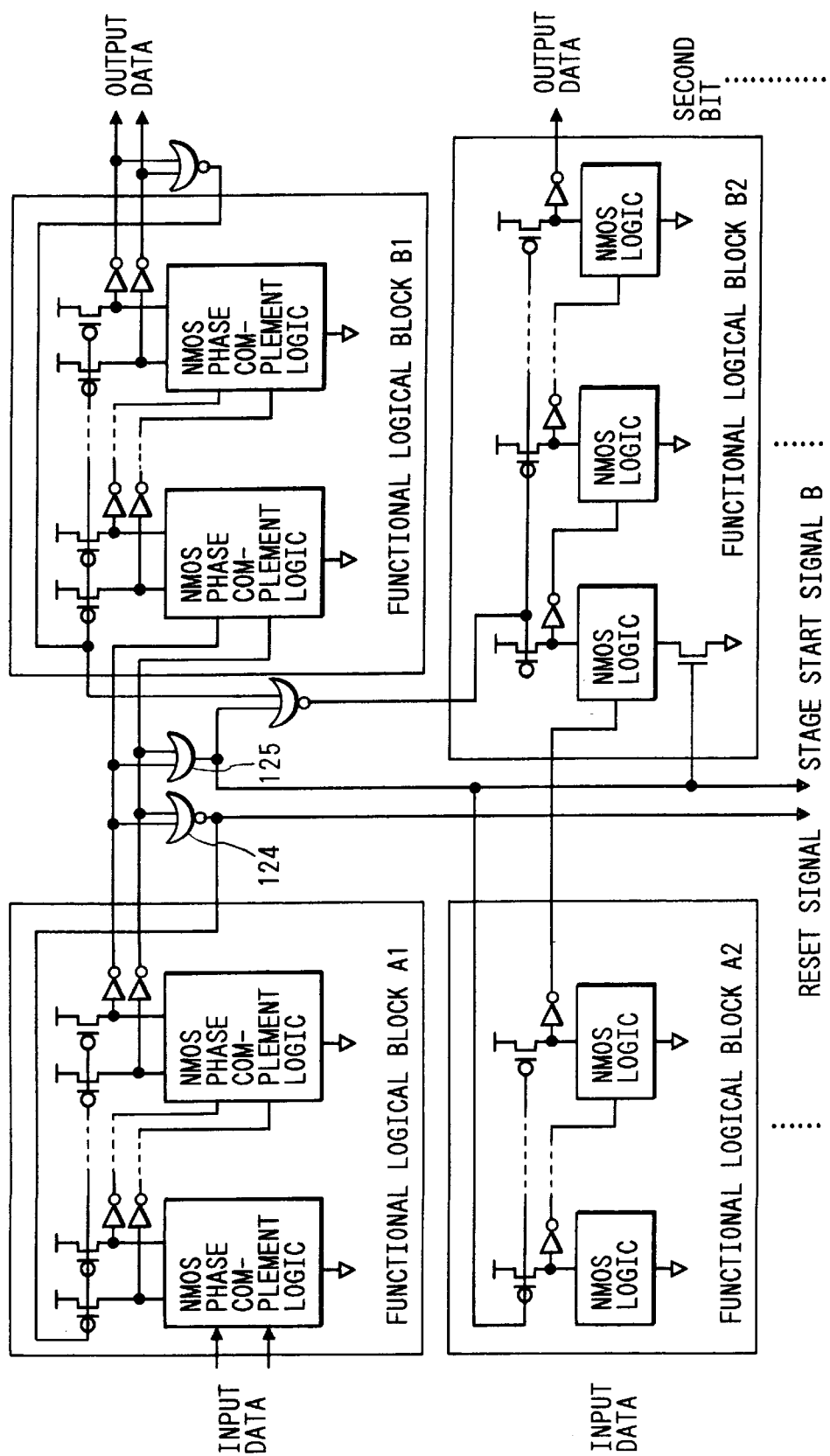
FIG. 9 shows an example wherein the embodiment shown in FIG. 1 is implemented by a dynamic circuit.
Figure 10:
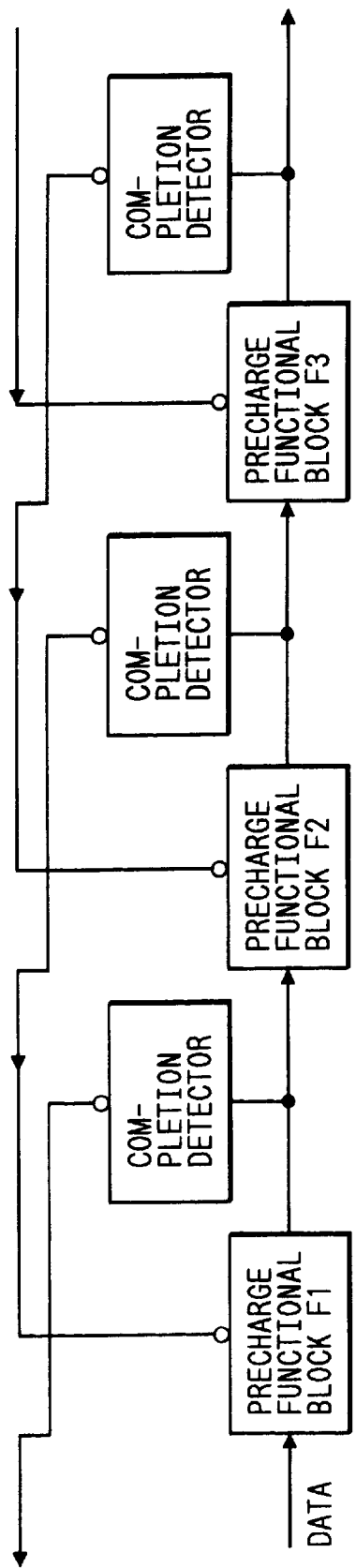
FIG. 10 shows a diagram used for explaining the second prior art.

An example wherein the embodiment shown in FIG. 1 is implemented by a dynamic circuit is shown in FIG. 9. Logical blocks A1 and B1, elements associated with the first bit, each have a data-arrival detecting function. Logical blocks A2 and B2 are elements associated with the second bit.

When the logical block A1 is in a reset state, phase-complement outputs are both low. In this state, a B-stage start signal is also low, not allowing the logical block B2 to start an operation. When the output of the logical block A1 has been set up, either of the phase complement outputs goes high, raising the B-stage start signal. In this state, the logical block B2 starts operations.

Figure 16:
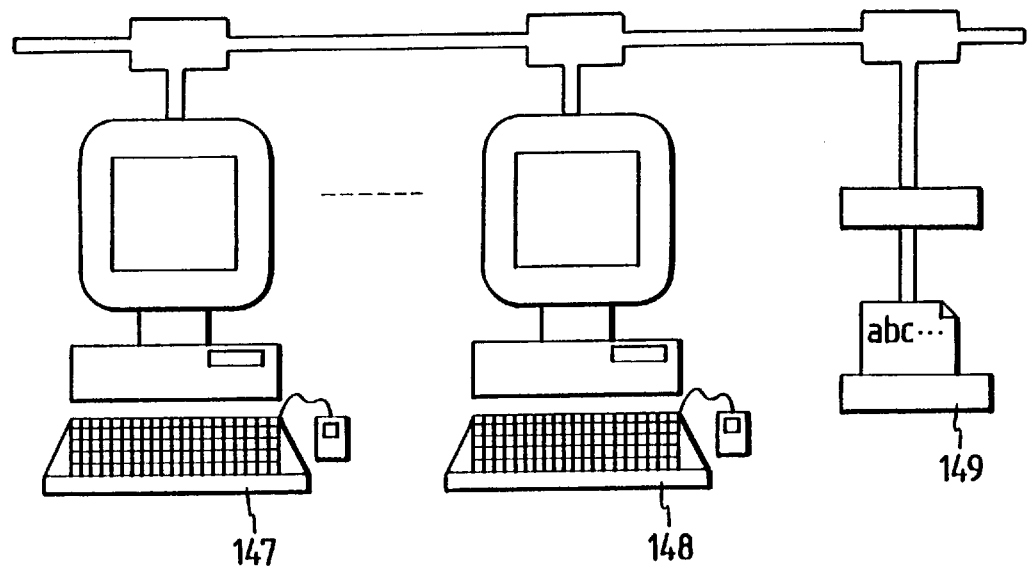
FIG. 16 shows a diagram used for explaining a system.

The present invention described so far can be applied to a system shown in FIG. 16 for example. Work-stations 147 and 148 as well as a printer 149 employ a plurality of LSI components to which the present invention is applied. A plurality of such work-stations 147 (or 148) and printers 149 are connected to each other in a network. As described above, the present invention is applied to circuits inside LSI components constituting the work-stations 147 and 148. In addition, the present invention can also be applied to interface units between the work-stations 147 and 148. For example, when data is transmitted by the work-station 147 to the work-station 148, the latter detects the arrival of the data from the former, generating a data-arrival signal internally. The work-station 148 then starts data processing synchronously with the data-arrival signal.

The present invention allows a plurality of data paths to operate synchronously and the clock skew to affect none of these data paths, enhancing performance. In the first embodiment shown in FIG. 2, four functional logical blocks associated with the first bit are connected in series between two latches which are synchronized with a clock signal. In this case, Inequality (4) is a condition to be satisfied by the total propagation delay time along a designed data path. On the other hand, the design condition used in the conventional technology is prescribed by Inequality (13). Comparison of the inequalities clearly indicates that the effect of the clock skew on the present embodiment is reduced to ¼. In addition, the other embodiments include functional logical blocks connected in series or in parallel between two latches which are synchronized with a clock signal. It should be noted, however, that the number of functional logical blocks is arbitrary. The effect of the clock skew is reduced to some degree which varies from case to case. In addition, the configuration of components associated with the first bit also applies to all other bits even if a plurality of bits exist. Inter-bit branches and inter-bit merges of data are also allowed as well. In the description of the embodiments, the configuration is expressed in terms of arrays of bits. It should be noted, however, that the meaning of the technical term 'bit' is not limited to the commonly known data unit. In a broader sense, by an array of bits, an array of logical functions is meant.

In other words, the configuration in the description may comprise arrays of logical functions. In either case, the effect of the clock skew on the delay time can be minimized. On top of that, in the case of the first embodiment described above for example, by merely providing functions for detecting data arrivals on the data path of the first bit, such functions are no longer required on the data paths of the second and subsequent bits. As a result, it is possible to implement the embodiments without increasing the number of transistors.

What is claimed is:

1. A semiconductor integrated circuit device comprising:

n functional circuit groups connected in series with one another for transmitting output signals, wherein each of said functional circuit groups includes a plurality of functional circuit blocks, wherein each of said functional circuit blocks executes a logical operation on an inputted signal and generates one of said output signals as a result thereof, and wherein the output signal of one of said plurality of functional circuit blocks in one functional circuit group controls transmitting timing of the output signals from the others of said plurality of functional circuit blocks in said one functional circuit group to said plurality of functional circuit blocks in another functional circuit group.

2. A semiconductor integrated circuit device according to claim 1, wherein each of said functional circuit groups includes m functional circuit blocks.

3. A semiconductor integrated circuit device comprising:

n functional circuit groups connected in series with one another for transmitting output signals, wherein each of said functional circuit groups includes a plurality of functional circuit blocks, wherein each of said functional circuit blocks executes a logical operation on an inputted signal and generates one of said output signals as a result thereof, wherein transmitting timing of said output signals from 1-th and n-th functional circuit groups is controlled by an external clock, and wherein, for remaining ones of said functional circuit groups, the output signal of one of said plurality of functional circuit blocks in one functional circuit group controls transmitting timing of the output signals from the others of said plurality of functional circuit blocks in said one functional circuit group to said plurality of functional circuit blocks in another functional circuit group.

4. A semiconductor integrated circuit device comprising:

at least one first functional circuit block, wherein said first functional block, responsive to an inputted signal, executes a logical operation and generates an output signal as a result thereof; and a plurality of second functional circuit blocks connected in parallel with the first functional circuit block, wherein said plurality of second functional circuit blocks, responsive to an inputted signal from an input source other than said first functional circuit block, execute a logical operation and generate output signals as a result thereof, and wherein the output signal of said first functional circuit block controls transmitting timings of the output signals of said plurality of second functional circuit blocks so that said plurality of second functional circuit blocks operate synchronously with said first functional circuit block.

* * * * *